United States Patent
Thomas et al.

(10) Patent No.: US 9,137,735 B2
(45) Date of Patent: Sep. 15, 2015

(54) METHOD AND APPARATUS FOR DISTRIBUTING WIRELESS LOCAL AREA NETWORK ACCESS INFORMATION

(75) Inventors: Shanthi E. Thomas, Carpentersville, IL (US); Ibrahima Niass, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 616 days.

(21) Appl. No.: 13/196,293

(22) Filed: Aug. 2, 2011

(65) Prior Publication Data
US 2013/0034090 A1 Feb. 7, 2013

(51) Int. Cl.
*H04W 48/18* (2009.01)
*H04W 48/04* (2009.01)
*H04W 84/12* (2009.01)

(52) U.S. Cl.
CPC .............. *H04W 48/04* (2013.01); *H04W 84/12* (2013.01)

(58) Field of Classification Search
CPC ... H04L 63/0823; H04L 63/10; H04W 12/08; H04W 48/04; H04W 48/16; H04W 48/18
USPC .......................................................... 370/338
See application file for complete search history.

(56) References Cited

U.S. PATENT DOCUMENTS

| | | | |
|---|---|---|---|
| 2004/0087317 A1* | 5/2004 | Caci ........................... | 455/456.1 |
| 2005/0286461 A1* | 12/2005 | Zhang et al. .................. | 370/328 |
| 2006/0073788 A1* | 4/2006 | Halkka et al. ................ | 455/41.2 |
| 2006/0075075 A1* | 4/2006 | Malinen et al. ............... | 709/220 |
| 2006/0265737 A1* | 11/2006 | Morris ................. | 726/3 |
| 2009/0041206 A1* | 2/2009 | Hobby et al. .................... | 379/45 |
| 2009/0054068 A1* | 2/2009 | Halkka et al. ................. | 455/445 |
| 2011/0111728 A1* | 5/2011 | Ferguson et al. .......... | 455/404.2 |
| 2011/0165892 A1* | 7/2011 | Ristich et al. .............. | 455/456.2 |
| 2012/0136923 A1* | 5/2012 | Grube .......................... | 709/203 |
| 2012/0302217 A1* | 11/2012 | Sennett et al. ............. | 455/414.1 |

OTHER PUBLICATIONS

International Search Report and Written Opinion for International Patent Application No. PCT/US2012/48327 mailed Nov. 22, 2012.
International Preliminary Report on Patentability for International Patent Application No. PCT/US2012/48327 issued on Feb. 4, 2014.

* cited by examiner

*Primary Examiner* — Andrew Lai
*Assistant Examiner* — M Mostazir Rahman
(74) *Attorney, Agent, or Firm* — Steven A. May; Randi L. Karpinia

(57) ABSTRACT

Methods, systems and apparatus are provided for distributing wireless local area network (WLAN) access information to a wireless communication device based on a current coverage area that the wireless communication device is located in. A location services server can determine, based on a current location of the wireless communication device, a current coverage area of the wireless communication device, and transmit information identifying the current coverage area to a directory services server. Based on the current coverage area, the public safety directory services server can determine relevant WLAN access information for the current coverage area, and transmit a message to the wireless communication device that includes the relevant WLAN access information.

21 Claims, 3 Drawing Sheets

METHOD AND APPARATUS FOR DISTRIBUTING WIRELESS LOCAL AREA NETWORK ACCESS INFORMATION

FIELD OF THE DISCLOSURE

The present disclosure relates generally to communications, and more particularly to methods, systems and apparatus for that allow for distribution of appropriate sets of Wireless Local Area Network (WLAN) access information in a timely manner.

BACKGROUND

Public safety users (e.g., police, fire fighters, and other responders) often need to access Wireless Local Area Networks (WLANs) at incident scenes and/or during mutual aid scenarios at foreign locations outside their home coverage area. Some WLANs may be public, whereas others may be private.

Private WLANs usually require that the public safety user's wireless communication device (WCD) has access rights to access the private WLAN. Access to such private WLANs can be controlled, for example, by knowledge of the WLAN's Service Set Identifier (SSID) and/or a secret security credential (e.g., a pass phrase, a key or a password).

As such, obtaining the appropriate security credentials and securely transferring them to the public safety user's WCD at the time of an incident can be cumbersome and lead to loss of critical time.

One solution for providing security credentials is to manually configure each public safety user's WCD with a complete list of security credential information needed to access all WLANs that may potentially need to be accessed (e.g., the security credential information for all nation-wide or state-wide or even county-wide WLANs).

However, this approach can be impractical due to memory constraints of the WCD. In addition, security credentials may get updated periodically, which would require re-configuration of the WCD each time this information is updated.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
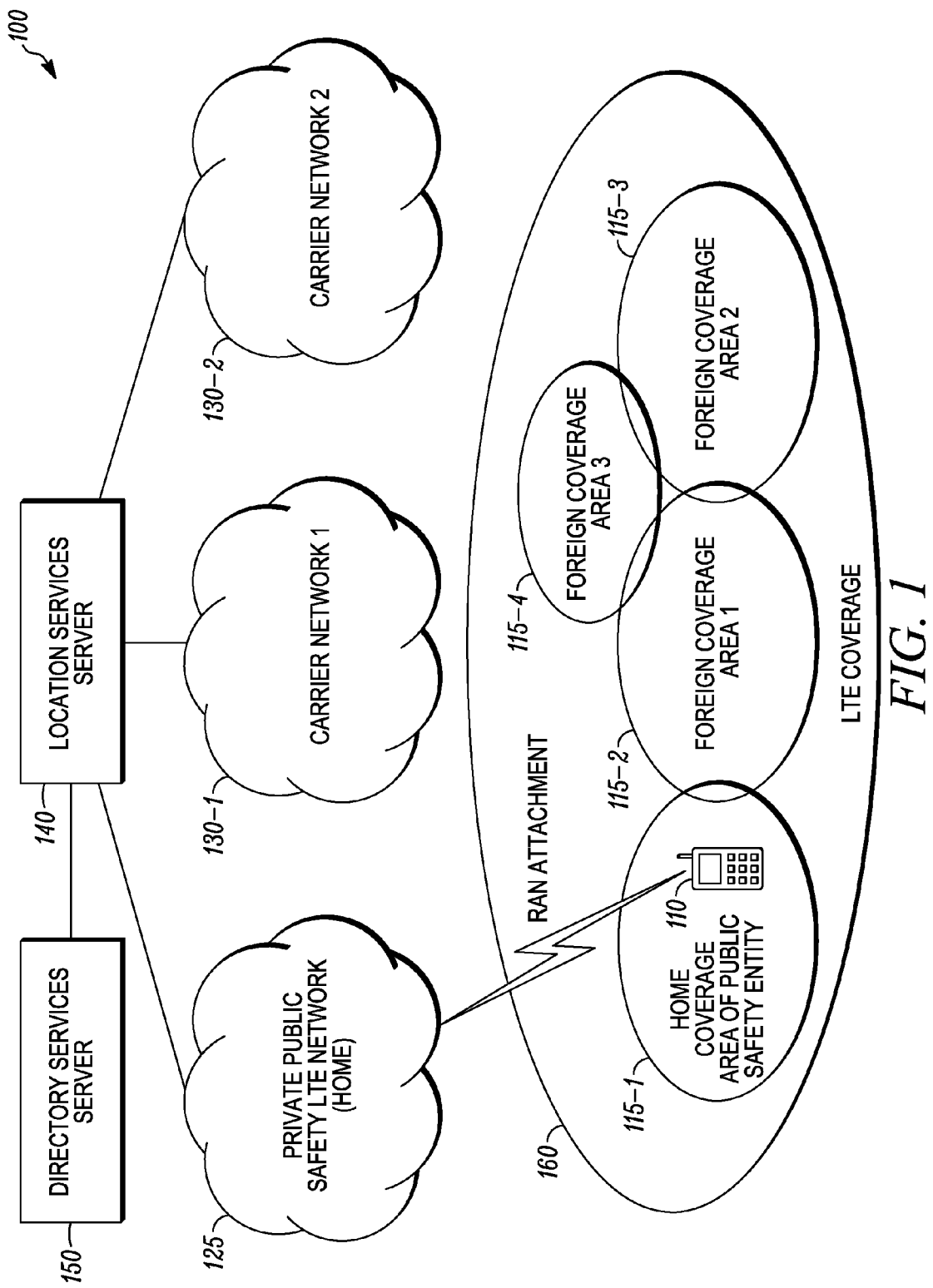
FIG. 1 is a block diagram of a communication network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

There is a need for methods, systems and apparatus that allow for timely distribution of relevant WLAN access information (e.g., SSID information and corresponding security credentials) for public safety accessible WLANs to a wireless communication device when it is located in a particular coverage area.

In accordance with the disclosed embodiments, methods, systems and apparatus are provided for distributing wireless local area network (WLAN) access information to a wireless communication device based on a current coverage area that the wireless communication device is located in. A location services server can determine, based on a current location of the wireless communication device, a current coverage area of the wireless communication device, and transmit information identifying the current coverage area to a directory services server. Based on the current coverage area, the public safety directory services server can determine relevant WLAN access information for the current coverage area, and transmit a message to the wireless communication device that includes the relevant WLAN access information.

FIG. 1 is a block diagram of a communication network 100 in accordance with some embodiments.

The communication network 100 includes a public safety WCD 110, a home public safety Radio Access Network (RAN) 125, public carrier RANs 130-1, 130-2, a public safety location services server 140, and a public safety directory services server 150. Although FIG. 1 includes only a single public safety WCD 110, those skilled in the art will appreciate that numerous public safety WCDs can be present in the communication network 100.

The illustrated wireless communication device 110 may be, for example, a portable/mobile radio, a personal digital assistant, a cellular telephone, a video terminal, a portable/mobile computer with a wireless modem, or any other wireless communication device. For purposes of the following discussions, the wireless communication device 110 may also referred to in the art as a subscriber unit, a mobile station, mobile equipment, a handset, a mobile subscriber, user equipment, or an equivalent used in any standard. As is well-known to those skilled in the art, the public safety WCD 110 can communicate over-the-air with the home public safety RAN 125, or the carrier RANs 130-1 and 130-2. In addition, although not illustrated, the WCD 110 may include a Global Positioning System (GPS) capability that allows it to determine GPS coordinates that specify its geographic location. As is well-know in the art, a GPS receiver in the WCD 110 receives signal information transmitted from a GPS transmitter and a GPS processor uses in the WCD 110 this information along with triangulation processing techniques to calculate the WCD's 110 geographic location, which can be specified as a latitude coordinate, a longitude coordinate and optionally an altitude coordinate.

Preliminarily, it is noted that any of the RANs 125, 130 of the communication network 100 can generally be any type of broadband radio access network, and that a specific non-limiting example will be described herein where one or more of the broadband radio access networks is a Long Term Evolution (LTE) compliant network that operates in accordance with LTE standards. As will be appreciated by those skilled in the art, the LTE refers to a standards development effort within 3rd Generation Partnership Project (3GPP) to develop specifications that define improvements to the Universal Mobile Telecommunications System (UMTS), which is described in a suite of Technical Specifications (TS) developed within and publicized by $3^{rd}$ Generation Partnership Project (3GPP), with the most recent version of the 3GPP TSs being published in September 2010. Copies of LTE standards can be obtained at http://www.3gpp.org/LTE. Enhancements to the UMTS that are described in the LTE standards were first introduced beginning with 3rd Generation Partnership Project (3GPP) Release 8. 3GPP Release 8 describes an architecture referred to as the Evolved Packet System (EPS), which includes an Evolved UTRAN (E-UTRAN) on the radio access side and an Evolved Packet Core (EPC) on the core network side.

Those skilled in the art will appreciate that a radio access network (RAN) is part of a mobile telecommunication system that serves as a bridge for radio access between WCDs and a core network (CN). Although not illustrated in FIG. 1 for sake of clarity, a network can include a number of infrastructure devices for facilitating communications for the WCDs operating in the system. Such infrastructure devices can include elements of a RAN that communicate with the WCDs via an air interface, such as for instance, eNodeBs, base radios, base stations, base transceiver stations, and the like. Each eNodeB or base station within a RAN can define one or more "cells" (i.e. a cell meaning in one example a coverage area of an eNodeB or a coverage area of a base station) of that radio access network, where each cell in a particular RAN have a unique cell identifier (ID). Such infrastructure devices further include elements of an infrastructure core (e.g., an Evolved Packet Core (EPC) in an LTE system) used to manage the allocation of radio resources of the network, with the infrastructure core including elements such as for instance, Mobility Management Entities, Signaling Gateways, Packet Data Network Gateways, etc. Other infrastructure devices that may be included in any one or each of the networks includes, but are not limited to, switches, zone controllers, base station controllers, repeaters, access points, routers, etc. For sake of brevity other details regarding the RANs 125, 130-1, 130-2 will not be described herein.

The home public safety Radio Access Network (RAN) 125 is a private RAN that is authorized for use by WCDs that are authorized by a public safety entity. The public safety entity can include one or more public safety agencies or organizations that each includes public safety personnel sometimes referred to as responders. Each public safety entity has a home coverage area (e.g., a grouping of cells serving a geographic area for that public safety entity) and zero or more foreign coverage areas, where the term coverage area refers to a specific geographical area within a RAN. In FIG. 1, the home public safety RAN 125 has region of LTE coverage that includes different coverage areas 115 including a home coverage area 115-1, and foreign coverage areas 115-2 . . . 115-4.

The public safety WCD 110 has a home public safety RAN 125 and is assigned a home coverage area 115-1. In FIG. 1, the public safety WCD 110 is illustrated as being in its home coverage area 115-1, and as being attached to its home public safety RAN 125.

Because the public safety WCD 110 is a portable device, it can move about or "roam" within the communication network 100. As the public safety WCD 110 moves about or roams within the communication network 100 it can move outside of the its home coverage area and into foreign coverage areas such as 115-2 . . . 115-4. There are roaming agreements between each of the RANs 125, 130-1, 130-2 that allow the WCDs to roam from their home RAN to foreign or neighbor RANs and continue to communicate when operating within one of the foreign or neighbor RANs. For example, the home public safety RAN 125 of WCD 110 has roaming agreements with public carrier RANs 130-1, 130-2 that allow WCD 110 (and any of its other authorized WCDs) to communicate over the public carrier RANs 130-1, 130-2 when they roam to areas that are within those public carrier RANs 130-1, 130-2. For instance, when WCD 110 moves outside the coverage range of its current home public safety RAN 125, it will authenticate with and attach to a new carrier RAN (presuming authentication is successful). As one non-limiting example with reference to FIG. 1, when the public safety WCD 110 roams outside of public safety RAN 125, the public safety WCD 110 can attach, for example, to carrier RAN 130-1 or carrier RAN 130-2.

Locations within each RAN are associated with one or more coverage areas. In some embodiments, each particular coverage area is specified as a range of geographic locations (e.g., GPS coordinates) or a range of cells.

In embodiments that associate a range of geographic locations with a particular public safety coverage area, depending on the implementation, the range of geographic locations may cover a portion of a particular RAN, a particular RAN, or multiple RANs. For example, in some implementations, the coverage area of particular RAN typically includes multiple different public safety coverage areas such that different ranges of geographic locations within a particular RAN each correspond to a particular public safety coverage area within that particular RAN. However, in some cases, the particular public safety coverage area may include all geographic locations within a particular RAN such that the particular public safety coverage area covers the entire coverage area of the RAN. In still other embodiments, the range of geographic locations that specify a particular public safety coverage area may include geographic locations from two or more RANs.

In embodiments that associate a range of cells with a particular public safety coverage area, depending on the implementation, the range of cells may cover a portion of a particular RAN, a particular RAN, or multiple RANs. For example, in some implementations, the coverage area of a particular RAN typically includes multiple different public safety coverage areas such that different ranges of cells within a particular RAN each correspond to a particular public safety coverage area within that particular RAN. However, in some cases, the particular public safety coverage area may include all cells within a particular RAN such that the particular public safety coverage area covers the entire coverage area of the RAN. In still other embodiments, the range of cells that specify a particular public safety coverage area may include cells from two or more RANs.

Each of the public safety RANs 125, 130-1, 130-2 is communicatively coupled to the public safety location services server 140. The location services server 140 is associated with a respective public safety entity and can be different for different public safety (PS) entities sharing the home public safety RAN 125. The public safety location services server 140 provides location services and maintains information regarding the location of the public safety WCD 110. Information maintained and stored at the public safety location services server 140 can include, for example, the home public safety RAN 125 of the public safety WCD 110, which RAN the public safety WCD 110 is presently attached to, a list of other neighboring RANs that the public safety WCD 110 can potentially roam to, information about the public safety WCD's 110 home coverage area 115-1, information about the public safety WCD's 110 current coverage area, and information about the foreign coverage areas 115-2 . . . 115-4 that the public safety WCD 110 may eventually or potentially visit and/or has historically visited in the past. The location services server 140 includes a database that allows the location services server 140 to determine, given the current cell location of the WCD 110 or given the current geographic location reported by the WCD 110 through the RAN that the WCD 110 is attached to, whether the WCD 110 is in its home coverage area 115-1 or is outside of its home coverage area 115-1 and in a foreign coverage area 115-2 . . . 115-4.

Whenever the public safety WCD 110 authenticates with and attaches to a RAN, it reports its location to the public safety location services server 140 via a location update message that indicates the current location of the WCD 110 using the attached RAN. The WCD 110 will continue to regularly report its location information to the public safety location services server 140 while attached to the RAN. The timing or frequency with which the WCD 110 reports its location information to the public safety location services server 140 can be based on a number of factors, including for example some pre-established timing frequency or after execution of some mobility procedures such as cell reselection or the like. Based on the location information reported by the WCD 110, the public safety location services server 140 can determine, among other things, a current coverage area of the public safety WCD 110, and whether the current coverage area has changed. The public safety location services server 140 is illustrated as being coupled to the public safety directory services server 150 for a given PS entity. Although the public safety location services server 140 and the public safety directory services server 150 are illustrated using separate functional blocks, in some implementations they can be co-located and implemented together at the same physical interoperability gateway device.

The public safety directory services server 150 for a given PS entity has a database that can store, for example, valid coverage areas (e.g., home and foreign coverage areas in which the PS entity's responders are authorized to access public safety applications), SSIDs and corresponding security credentials for WLANs located in each of the valid coverage areas, addressing information for each responder and for each responder's WCD such as telephone numbers, electronic mail addresses, push-to-talk (PTT) identifiers (IDs), WCD IDs, etc. The directory server may also include real-time information such as responder's presence status, responder's location, weather conditions, traffic conditions, etc.

As such, the public safety WCD 110 will have access to WLAN access information for any public safety accessible WLAN that it potentially wants to access in any potential coverage areas that the public safety WCD 110 might potentially roam to. The directory services server 150 can store, for example, WLAN access information for all WLANs that are authorized for public safety access or "public safety accessible," and within geographic areas covered by a home radio access network of the wireless communication device and/or by other carrier radio access networks that the wireless communication device is authorized to roam to.

This allows the public safety WCD 110 to access WLAN access information stored at the public safety directory services server 150 that is "relevant" to the public safety WCD 110 given its current coverage area. As will be described below, the public safety WCD 110 can obtain relevant WLAN access information (stored at the public safety directory services server 150) based on its current coverage area. The relevant WLAN access information is "local" WLAN access information for all public safety accessible WLANs within the current coverage area of the public safety WCD 110 (e.g., a specific subset of all WLAN access information stored at the public safety directory services server 150 that is applicable to a current coverage area of the public safety WCD 110).

Depending on the implementation, the relevant WLAN access information may be pushed to the public safety WCD 110 by the public safety directory services server 150, or it may be pulled by the public safety WCD 110 from public safety directory services server 150 by sending a request from the public safety WCD 110.

Figure 2:
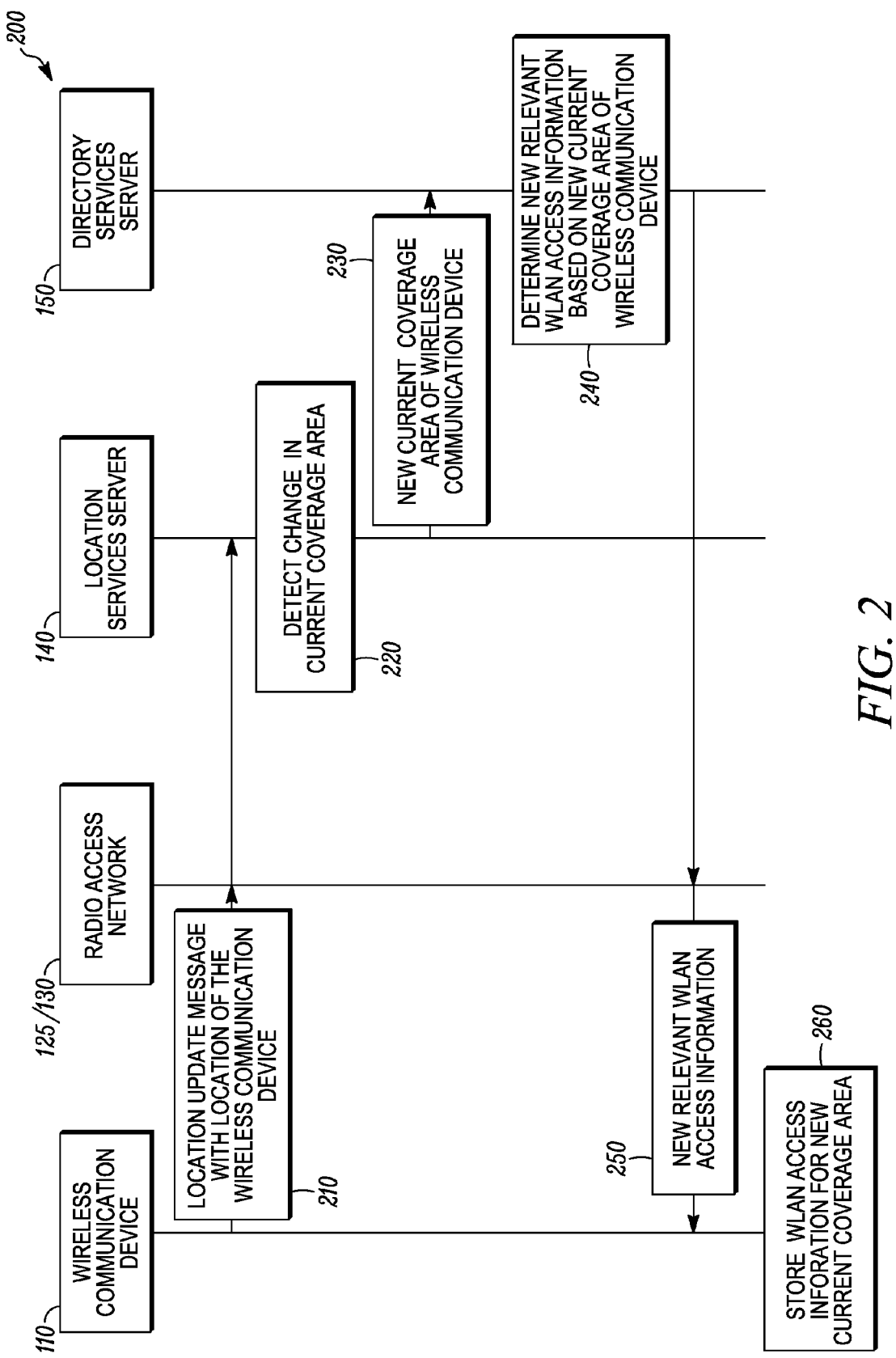
FIG. 2 is an information flow diagram of a push method for distribution of relevant Wireless Local Area Network (WLAN) access information for public safety accessible WLANs in a particular coverage area in accordance with some embodiments.

FIG. 2 is an information flow diagram of a push method 200 for distribution of relevant WLAN access information for public safety accessible WLANs in a particular coverage area in accordance with some embodiments.

Prior to method 200, the public safety directory services server 150 is configured with WLAN access information for all WLANs that are (1) authorized for public safety access, and (2) within geographic areas that are valid for the public safety entity (e.g., where radio frequency (RF) coverage is provided by the home public safety RAN of the wireless communication device and/or any roaming partner (e.g., other carrier RANs that the home public safety RAN has roaming agreements with and that the wireless communication device is authorized to roam to).

As such, the public safety WCD 110 will have access to WLAN access information for any public safety accessible WLAN that it potentially wants to access in any potential coverage areas that the public safety WCD 110 might potentially roam to. As will be described below, the public safety WCD 110 will obtain relevant WLAN access information stored at the public safety directory services server 150 based on its current coverage area. The relevant WLAN access information is "local" WLAN access information for all public safety accessible WLANs within a current coverage area of the public safety WCD 110.

Prior to the start of method 200, the WCD 110 has already successfully attached and authenticated to the current RAN 125/130.

When a trigger event for location update occurs at 210 the public safety WCD 110 transmits a location update message to the public safety RAN 125/130, which the current public safety RAN 125/130 forwards to the public safety location services server 140. This way the public safety WCD 110 registers its current location with the public safety location services server 140 for the PS entity corresponding to WCD 110. The location update message includes content or location parameters that indicate the location of the public safety WCD 110. The content of the location update message can vary depending on the implementation. In one embodiment, the location update message includes at least one of (1) GPS parameters (e.g., GPS coordinates) that specify a current geographic location of the public safety WCD 110, or (2) a cell identifier corresponding to a particular cell within that particular radio access network currently being used by the public safety WCD 110.

The public safety location services server 140 for a PS entity maintains a database that maps either (1) a range of geographic locations, or (2) a range of cells to a particular coverage area for that PS entity. At 220, based on the location update message, the public safety location services server 140 can determine a current coverage area of the public safety WCD 110, and whether the current coverage area has changed.

When the current coverage area has changed, then at 230, the public safety location services server 140 can transmit information identifying the "new" current coverage area of the public safety WCD 110 to the public safety directory services server 150.

Based on the current coverage area of the public safety WCD 110, at 240, the public safety directory services server 150 determines the relevant WLAN access information. The relevant WLAN access information includes a list of Service Set Identifiers (SSIDs) in the current coverage area where the public safety WCD 110 is currently located, and corresponding security credentials for each SSID. In some implementations, the relevant WLAN access information can include a list of SSIDs for a defined radius from the WCD's 110 current coverage area where the public safety WCD 110 is currently located, and corresponding security credentials for each SSID. In some implementations, the list could also include unadvertised Service Set Identifiers (SSIDs) and their corresponding security credentials, and information on where they can be used.

At 250, the public safety directory services server 150 communicates a message that includes the relevant WLAN access information to the public safety WCD 110 via the current public safety RAN 125/130 that the public safety WCD 110 is attached to. One particular implementation of a message format for relevant WLAN access information for a current coverage area is illustrated in Table 1 below.

TABLE 1

| Coverage Area | | Number of Service Set Identifiers (SSIDs) | | | |
| --- | --- | --- | --- | --- | --- |
| SSID name 1 | Advertised/ unadvertised | Security Credential Type | Length | Security Credential | Authentication protocol |
| ... | | | | ... | |
| SSID name N | Advertised/ unadvertised | Security Credential Type | Length | Security Credential | Authentication protocol |

As illustrated in Table 1, for a particular coverage area the relevant WLAN access information can include a number of SSIDs. For each SSID, Table 1 includes an SSID name (column 1), an indication of whether that SSID is advertised or unadvertised (column 2), a security credential type (e.g., password, passphrase, or key type) (column 3), a length of the security credential (column 4), a security credential (e.g., password, passphrase, or symmetric key or asymmetric key pair) (column 5), and an authentication protocol (column 6). Although not illustrated in column 5, the security credential can also include an expiration time.

In some implementations, prior to transmission at 250, the public safety directory services server 150 secures the relevant WLAN access information message via any standard means (e.g., by encrypting it using a public key of the public safety WCD 110, or by signing with a certificate of the public safety WCD 110, or by any other standard methods).

At 260, the public safety WCD 110 stores the relevant WLAN access information (transmitted at 250) for it's current coverage area in memory. In some implementations, the public safety WCD 110 encrypts the relevant WLAN access information, and then stores the encrypted relevant WLAN access information in memory so that it can later connect to one of the relevant WLANs when needed. In some implementations, the public safety WCD 110 overwrites any previously stored WLAN access information with the relevant WLAN access information (from 250) for its the current coverage area so that the public safety WCD 110 contains only the relevant WLAN access information for its the current coverage area.

Having described a push implementation, a pull implementation will now be described.

In pull implementations, relevant WLAN access information may be pulled or requested by the public safety WCD 110. One exemplary pull method 300 will now be described with reference to FIG. 3.

Figure 3:
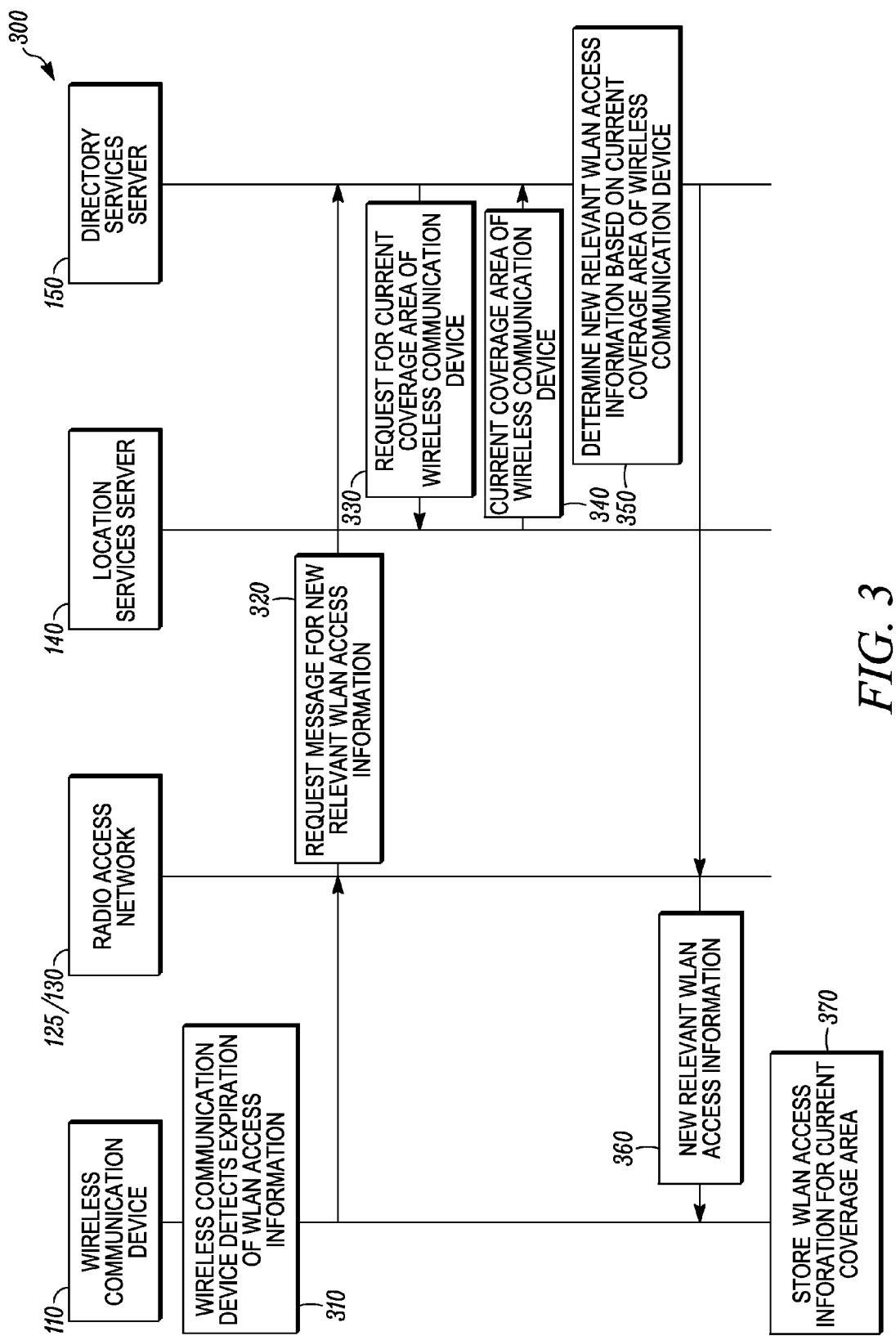
FIG. 3 is an information flow diagram of a pull method for distribution of relevant WLAN access information for public safety accessible WLANs in a particular coverage area in accordance with some embodiments.

FIG. 3 is an information flow diagram of a pull method 300 for distribution of relevant WLAN access information for public safety accessible WLANs in a particular coverage area in accordance with some embodiments.

Method 300 begins at 310 when a trigger event occurs. The trigger event can vary depending on the implementation. For example, in one implementation that is illustrated in FIG. 3, the trigger event occurs whenever the public safety WCD 110 determines that WLAN access information has expired (e.g., as indicated by the expiration data associated with any of the security credentials that the public safety WCD 110 has previously stored).

At 320, in response to the trigger event, the public safety WCD 110 can send a request message that is destined for the public safety directory services server 150. The request message indicates that the public safety WCD 110 is requesting its "new" or "updated" relevant WLAN access information. One embodiment of the request message from the public safety WCD 110 can be as shown in Table 2 below.

TABLE 2

| WLAN Access Information Request | WCD Identifier |
| --- | --- |

As illustrated in Table 2, the request message includes a header that indicates that the message is a WLAN Access Information request and an identifier for the WCD 110 (e.g., Subscriber ID or International Mobile Subscriber Identity). In some implementations, the request message may be signed using a device certificate of the public safety WCD 110 or authenticated by any other standard authentication protocols supported by the public safety directory services server 150. As will be described below, in one embodiment, the public safety directory services server 150 obtains location information for the public safety WCD 110 from the public safety location services server 140. However, in an alternative embodiment, the request message of Table 2 can also include a current location of the WCD 110, which can allow the request message to be sent directly to the public safety directory services server 150. This eliminates the need to involve the public safety location services server 140 in the communication sequence.

At 330, in response to the request message received at 320, the public safety directory services server 150 communicates a response message to the public safety location services server 140 with a request for the current coverage area of the public safety WCD 110.

At 340, the public safety location services server 140 responds to the response message, and transmits a message to the public safety directory services server 150. This message includes information about the current coverage area of the public safety WCD 110.

When the public safety directory services server 150 receives the message (transmitted at 340), the method 300 proceeds to 350, where the public safety directory services server 150 determines the relevant WLAN access information based on the current coverage area of the public safety WCD 110.

At 360, the public safety directory services server 150 communicates the "new" or "updated" relevant WLAN access information to the public safety WCD 110 via the current RAN 125/130 that the public safety WCD 110 is attached to. One particular implementation of a message format for the relevant WLAN access information is illustrated in Table 1 above. As above, in some implementations, prior to transmission, the public safety directory services server 150 secures the relevant WLAN access information via any known security means.

At 370, the public safety WCD 110 stores the relevant WLAN access information (transmitted at 360) for it's current coverage area in memory. In some implementations, the public safety WCD 110 encrypts the relevant WLAN access information prior to storing it in memory. In some implementations, the public safety WCD 110 overwrites any previously stored WLAN access information with the relevant WLAN access information for its current coverage area.

Conclusion

As described above, methods, systems and apparatus are provided that allow for the public safety WCD 110 to obtain relevant WLAN access information for its current coverage area in a timely manner. The current coverage area can be either its home coverage area or any foreign coverage area. As such, the disclosed embodiments can allow the public safety WCD 110 to gain almost immediate access any public or private WLANs that are authorized for public safety access regardless of the public safety WCD's 110 location in a way that is seamless to the public safety users (e.g., without any manual intervention or out-of-band methods). This makes the disclosed embodiments useful, for example, when the public safety WCD 110 roams to the scene of an incident that occurs in a foreign (or neighboring) coverage area and time is of the essence in obtaining access to WLANs in that foreign coverage area.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for distributing wireless local area network (WLAN) access information to a wireless communication device based on a current location of the wireless communication device, the method comprising:

receiving an indication of the current location of the wireless communication device, where the wireless communication device is located in one or more of a public safety communication system and a public carrier communication system;
determining, at the location services server based on the current location of the wireless communication device in the one or more of the public safety communication system and the public carrier communication system, a current coverage area corresponding to the current location, and then transmitting a message to a directory services server that comprises information identifying the current coverage area; and
determining, at the directory services server, relevant WLAN access information for the current coverage area, wherein the relevant WLAN access information comprises a security credential controlling access to a corresponding WLAN; and then transmitting, from the directory services server, a message to the wireless communication device that comprises the relevant WLAN access information.

2. The method according to claim 1, further comprising:
transmitting a location update message from the wireless communication device to the location services server, wherein the location update message indicates the current location of the wireless communication device.

3. The method according to claim 2, wherein the location update message specifies the current location of the wireless communication device via at least one of: a current geographic location of the wireless communication device, and a current cell location of the wireless communication device.

4. The method according to claim 2, wherein transmitting the location update message to the location services server comprises:
determining, by the wireless communication device, to update its current location; and
in response to determining to update the current location, transmitting, by the wireless communication device to the location services server, the location update message.

5. The method according to claim 1, wherein each coverage area is defined based on either: a range of geographic locations, or a range of cells, and wherein the location services server maintains a database that maps either a range of geographic locations to a particular coverage area, or a range of cells to the particular coverage area.

6. The method according to claim 5, wherein each coverage area is defined based on a range of geographic locations that cover either:
a portion of a particular radio access network such that the particular radio access network comprises multiple different coverage areas that each include different ranges of geographic locations within the particular radio access network;
a particular radio access network such that one coverage area includes all geographic locations within a coverage area of the particular radio access network; or
multiple radio access networks and include geographic locations from the multiple radio access networks.

7. The method according to claim 5, wherein each coverage area is defined based on a range of cells that cover either:
a portion of a particular radio access network such that the particular radio access network comprises multiple different coverage areas that each include different ranges of cells within the particular radio access network;
a particular radio access network such that one coverage area includes all cells within a coverage area of the particular radio access network; or
multiple radio access networks and include cells from the multiple radio access networks.

8. The method according to claim 1, wherein the directory services server stores WLAN access information for all WLANs that are authorized for public safety access and within geographic areas covered by a home radio access network of the wireless communication device and by other carrier radio access networks that the wireless communication device is authorized to roam to, and wherein the relevant WLAN access information is WLAN access information for one or more WLANs authorized for public safety access.

9. The method according to claim 1, wherein the relevant WLAN access information for the current coverage area comprises:
a subset of the WLAN access information that is stored at the directory services server that corresponds to public safety accessible WLANs in the current coverage area of the wireless communication device.

10. The method according to claim 9, wherein the relevant WLAN access information for the current coverage area comprises:
a list of Service Set Identifiers (SSIDs) within the current coverage area where the wireless communication device is currently located; and
corresponding security credentials for each SSID in the list of SSIDs, wherein the security credentials comprise a passphrase, a key, or a password controlling access to a WLAN access point.

11. The method according to claim 10, wherein the list of Service Set Identifiers (SSIDs) further comprises Service Set Identifiers (SSIDs) within a defined radius of the current coverage area where the wireless communication device is currently located.

12. The method according to claim 10, wherein the security credentials comprise at least one of: a password, a passphrase, a symmetric key or an asymmetric key.

13. The method according to claim 1, further comprising:
comparing, at the location services server, the current coverage area of the wireless communication device to a prior coverage area of the wireless communication device, and
wherein transmitting a message to the directory services server that comprises information identifying the current coverage area of the wireless communication device, comprises:
transmitting the message to the directory services server that comprises information identifying the current coverage area of the wireless communication device only when the current coverage area of the wireless communication device has changed from the prior coverage area of the wireless communication device.

14. The method according to claim 1, when the wireless communication device determines that previously stored WLAN access information has expired, further comprising:
transmitting, from the wireless communication device, a request message to the directory services server, wherein the request message comprises: an identifier for the wireless communication device, and an indication that the wireless communication device requests the relevant WLAN access information.

15. The method according to claim 14, further comprising:
communicating a response message from the directory services server to the location services server in response to the request message, wherein the response message comprises a request for the current coverage area of the wireless communication device.

16. The method according to claim 1, further comprising:
encrypting the relevant WLAN access information at the wireless communication device; and
overwriting any previously stored WLAN access information stored in memory at the wireless communication device with the encrypted relevant WLAN access information for the current coverage area so that the wireless communication device stores only the encrypted relevant WLAN access information for the current coverage area in memory.

17. The method according to claim 1, wherein the wireless communication device is public safety wireless communication device designed to communicate over a private home public safety radio access network or carrier radio access networks that private home public safety radio access network has roaming agreements with, wherein the location services server and the directory services server are associated with a specific public safety entity that is authorized to communicate with the private home public safety radio access network.

18. A system for distributing wireless local area network (WLAN) access information, the system comprising:
a wireless communication device that is designed to transmit a location update message that indicates a current location of the wireless communication device;
a location services server that is designed to:
determine, based on the current location of the wireless communication device, a current coverage area that corresponds to the current location where the wireless communication device is located in one or more of a public safety communication system and a public carrier communication system; and
transmit information identifying the current coverage area; and
a directory services server that is designed to:
store WLAN access information for all WLANs that are authorized for public safety access, and within geographic areas covered by a home radio access network of the wireless communication device and by other carrier radio access networks that the wireless communication device is authorized to roam to;
determine relevant WLAN access information for the current coverage area, wherein the relevant WLAN access information comprises a security credential controlling access to a corresponding WLAN; and
transmit a message to the wireless communication device that includes the relevant WLAN access information.

19. The system according to claim 18, wherein the location update message specifies the current location of the wireless communication device via at least one of: a current geographic location of the public safety wireless communication device, and a current cell location of the public safety wireless communication device.

20. The system according to claim 18, wherein each coverage area is defined based on either: a range of geographic locations, or a range of cells, and wherein the location services server maintains a database that maps either a range of geographic locations to a particular coverage area, or a range of cells to the particular coverage area.

21. The system according to claim 18, wherein the relevant WLAN access information for the current coverage area comprises:
a list of Service Set Identifiers (SSIDs) within the current coverage area where the wireless communication device is currently located; and
corresponding security credentials for each SSID in the list of SSIDs.

* * * * *